(12) United States Patent
Shima et al.

(10) Patent No.: US 8,057,736 B2
(45) Date of Patent: Nov. 15, 2011

(54) HEARTH STRUCTURE OF ROTARY FURNACE HEARTH

(75) Inventors: Shinji Shima, Kitakyushu (JP);
Toshitaka Nakayama, Kitakyushu (JP);
Tomoaki Shibata, Tokyo (JP)

(73) Assignees: Nippon Steel Corporation, Tokyo (JP);
Nippon Steel Engineering Co., Ltd., Tokyo (JP)

( * ) Notice: Subject to any disclaimer, the term of this patent is extended or adjusted under 35 U.S.C. 154(b) by 303 days.

(21) Appl. No.: 12/226,018

(22) PCT Filed: Sep. 15, 2006

(86) PCT No.: PCT/JP2006/318792
§ 371 (c)(1),
(2), (4) Date: Oct. 3, 2008

(87) PCT Pub. No.: WO2007/113928
PCT Pub. Date: Oct. 11, 2007

(65) Prior Publication Data
US 2009/0127754 A1 May 21, 2009

(30) Foreign Application Priority Data
Apr. 3, 2006 (JP) .................................. 2006-101405

(51) Int. Cl.
*C21B 13/08* (2006.01)
*C21B 3/00* (2006.01)
*C22B 7/00* (2006.01)
(52) U.S. Cl. ........................................ 266/248; 266/274
(58) Field of Classification Search .................. 266/248, 266/276
See application file for complete search history.

(56) References Cited

U.S. PATENT DOCUMENTS
4,597,564 A * 7/1986 Hanewald et al. ............ 266/274

FOREIGN PATENT DOCUMENTS

| JP | 2001-254114 A | | 9/2001 |
|---|---|---|---|
| JP | 2001-324274 A | | 11/2001 |
| JP | 2002-310564 A | | 10/2002 |
| JP | 2002350065 A | * | 12/2002 |
| JP | 2003-185348 A | | 7/2003 |

* cited by examiner

*Primary Examiner* — Kiley Stoner
*Assistant Examiner* — Alexander Polyansky
(74) *Attorney, Agent, or Firm* — Birch, Stewart, Kolasch & Birch, LLP

(57) ABSTRACT

The present invention discovers a new structural design technique which provides clearances between refractories 13 and fills the clearances with various types of refractories or refractory materials like in the past and, furthermore, uses another method to secure the heat expansion absorption function and provides a hearth structure of a rotary furnace hearth 1 able to prevent contact between the hearth structure and furnace side walls 3 and 4 caused by heat expansion of the refractories 13 and realize safe and smooth operation, that is, a hearth structure of a rotary furnace hearth laying two or more layers of refractories between side blocks 9 and 10 built at the inner circumferential end and outer circumferential end of a hearth refractory bed 7 of a rotary furnace hearth 1 and laying a powder or pellet hearth material 16 on its top surface, the hearth structure of a rotary furnace hearth 1 characterized by using refractories having a compressive strength of 0.1 to 5 MPa at 800 to 1500° C. for the refractories 14 laid at least at the topmost layer.

5 Claims, 4 Drawing Sheets

NO MORTARING

Fig.2
(a)
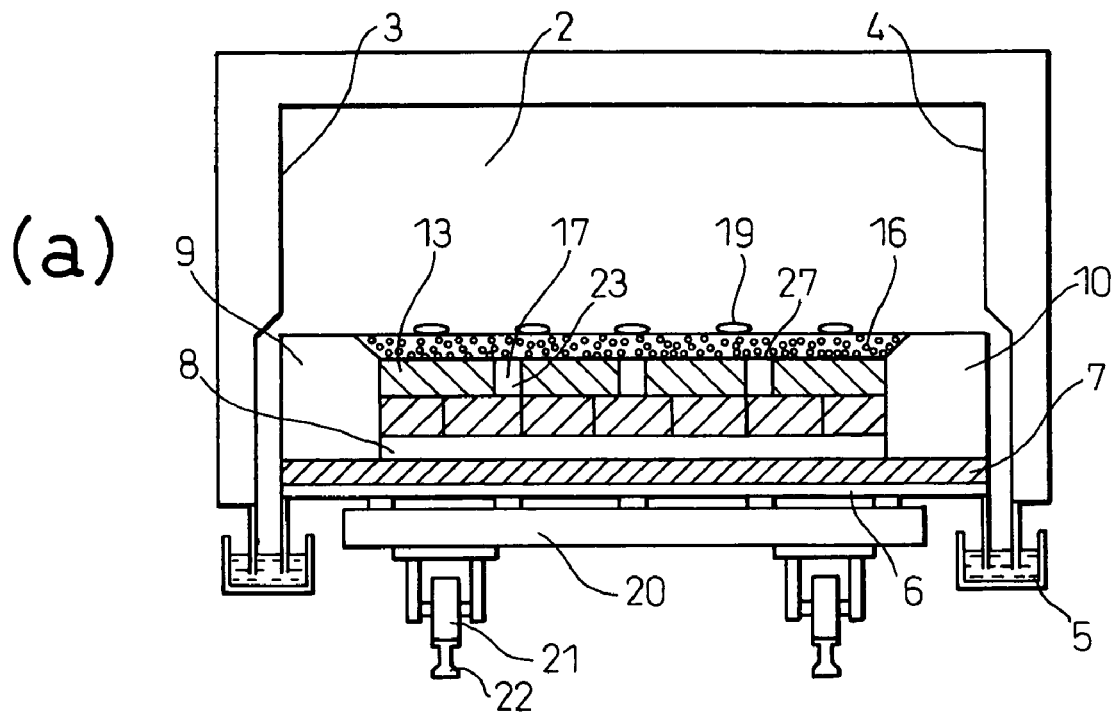
(b)
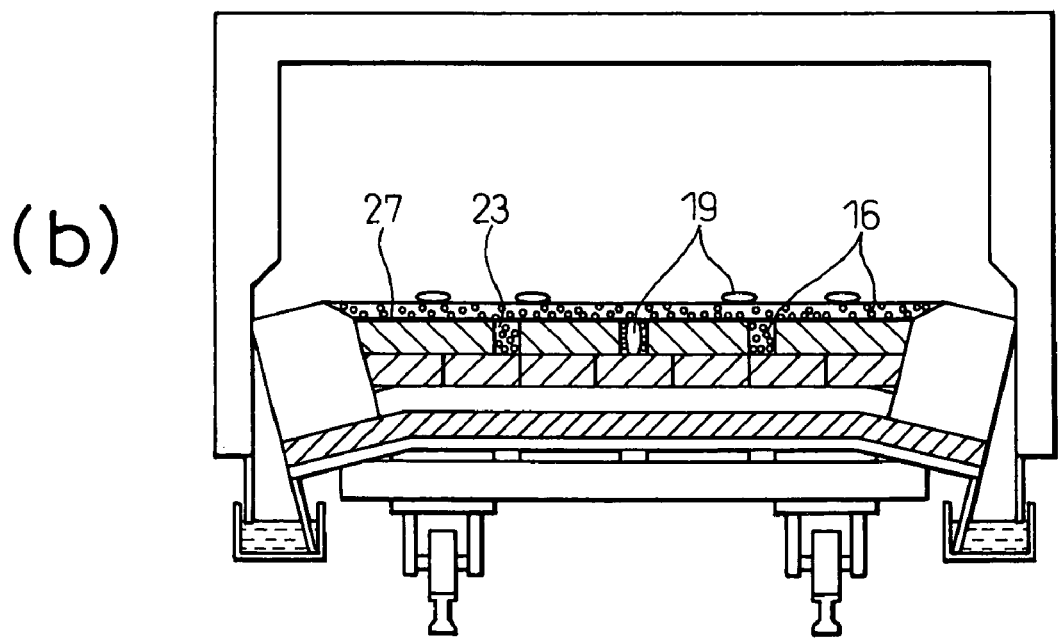

NO MORTARING

HEARTH STRUCTURE OF ROTARY FURNACE HEARTH

TECHNICAL FIELD

The present invention relates to a hearth structure of a rotary furnace hearth for mainly recovering direct reduced iron (DRI) from iron ore, iron-making waste, and other materials, more particularly relates to a hearth structure of a rotary furnace hearth preventing contact between the hearth structure and furnace side walls caused by the heat expansion of the laid refractories and enabling realization of safe and smooth operation.

BACKGROUND ART

In general, rotary furnace hearths are facilities heating, sintering, and reducing raw materials to recover high added value direct reduced iron. A rotary furnace hearth, as shown in FIG. 1 and FIG. 2(a), is comprised of a carriage 20 of a ring-shaped (donut-shaped) planar shape, an iron plate 6 and hearth refractory bed 7 carried on the carriage 20, and refractories 8, refractories 13, hearth materials 16, ceramic fiber blankets 27, etc. carried on the top surface of the hearth refractory bed 7. On the hearth material 16, raw material 19 comprised of iron ore or dust, sludge, scale, and other iron-making waste generated from iron-making plants is placed and heated to a high temperature state by burners or other heating means. The heated raw material 19 is rotated inside the furnace chamber 2 so as to recover direct reduced iron (DRI) from the raw material 19.

For this reason, the hearth structure comprised of the hearth refractory bed 7, refractories 8, side blocks 9 and 10, refractories 13, etc. is exposed to a high temperature along with the raw materials, so the hearth structure unavoidably expands under heat. Due to this, there is the problem that the furnace side walls 3 and 4 and the hearth structure rotating inside it frequently come into contact resulting in damage to the facilities and obstruction of normal carriage rotation. Therefore, to prevent damage to the facility and contact with the furnace side walls, it is necessary to provide the hearth structure of the rotary furnace hearth with a mechanism for absorbing the heat expansion.

In the past, as shown in FIG. 2(a), clearances (margins for expansion) 23 were provided between the refractories 13 laid between the side blocks 9 and 10 so as to absorb the refractory heat expansion, but in a rotary furnace hearth for recovering DRI, a powder or pellet hearth material 16 is laid on the top surface of the refractories 13 for preventing the DRI from melt bonding with the refractories 13, so there was the problem that hearth material 16 and the raw material 19 itself would drop inside the above heat expansion absorption clearances causing a loss of the heat expansion absorption function.

To solve this problem, Japanese Patent Publication (A) No. 2002-310564 discloses to prevent the hearth material 16 etc. from dropping into the clearances by the method of filling the clearances provided as the margins for expansion with ceramic fiber sheets or ceramic fiber blankets. Furthermore, to prevent the hearth material 16 or raw material 19 from entering the clearances 23, it may also be considered to lay ceramic fiber blankets 27 at the bottom surface of the hearth material 16.

However, the ceramic fiber sheets or ceramic fiber blankets etc. used as fillers are strongly compressed due to the heat expansion of the refractories under the high temperature atmosphere in actual operations and plastically deform as a result. After operation ends, the refractories are cooled and clearances form and do not return to the original state, so the hearth material 16 or DRI drop into and build up in the clearances formed. Further, the ceramic fiber blankets 27 laid at the bottom surface of the hearth material 16 shrink by the heat and are crushed by the hearth material 16 or raw material 19 to thereby break. It was therefore not possible to prevent the hearth material 16 and raw material 19 from dropping into the margins for expansion of the refractories over the long term.

In this way, in the method of filling the clearances provided as the margins for expansion with ceramic fiber sheets or ceramic fiber blankets etc. to absorb the heat expansion, there was the problem that it was only possible to obtain the heat expansion absorption function for the short time until the ceramic fiber blankets 27 broke.

In this way, with the conventional method, it was not possible to substantially permanently secure the heat expansion absorption clearances (margins for expansion) 23 along with actual operation. As shown in FIG. 2(b), it was not possible to completely avoid the heat expansion force of the refractories 13 from pushing apart the side blocks 9 and 10 at the two sides and the contact of the side blocks 9 built at the inner circumference end of the hearth refractory bed 7 and the inner circumference side furnace side walls 3 and contact of the side blocks 10 built at the outer circumference end of the hearth refractory bed 7 and the outer circumference side furnace side walls 4. That is, there was a structural limit in the conventional method of providing clearances (margins of expansion) 23 between the refractories laid between the side blocks 9 and 10 to absorb the heat expansion when laying the hearth material 16 on the top surface of the refractories 13.

DISCLOSURE OF INVENTION

The present invention does not, like in the past, provide clearances between the refractories and fill the clearances with various types of refractories or refractory materials, but provides a new design technique able to secure the heat expansion absorption function by a combination with another method or with a conventional method and provides a hearth structure of a rotary furnace hearth able to prevent contact of the hearth structure and furnace side walls due to heat expansion of the refractories and realize safe and smooth operation.

The present invention was made to solve the above problem and has as its gist the following:

(1) A hearth structure of a rotary furnace hearth laying two or more layers of refractories between side blocks built at an inner circumference end and outer circumference end of a hearth refractory bed of a rotary furnace hearth and laying a powder or pellet hearth material on its top surface, said hearth structure of a rotary furnace hearth characterized by using refractories having a compressive strength of 0.1 to 5 MPa at 800 to 1500° C. for at least the refractories laid at the topmost layer.

(2) A hearth structure of a rotary furnace hearth as set forth in (1) characterized by using refractories having a compressive strength of 8 to 130 MPa at 800 to 1500° C. for said side blocks.

(3) A hearth structure of a rotary furnace hearth as set forth in (1) or (2) characterized by strongly fastening said side blocks to the hearth refractory bed by anchor bricks.

(4) A hearth structure of a rotary furnace hearth as set forth in any one of (1) to (3) characterized by building said side blocks provided with a plurality of clearances in a circumferential direction.

(5) A hearth structure of a rotary furnace hearth as set forth in any one of (1) to (3) characterized by making a horizontal cross-sectional shape of said side blocks an upwardly tapering stepped shape.

(6) A hearth structure of a rotary furnace hearth as set forth in any one of (1) to (5) characterized in that joints of the refractories laid at the topmost layer do not penetrate down to the lower layer refractories.

BRIEF DESCRIPTION OF THE DRAWINGS

FIG. 2 is a cross-sectional view showing a conventional hearth refractory structure.

BEST MODE FOR CARRYING OUT THE INVENTION

Figure 1:
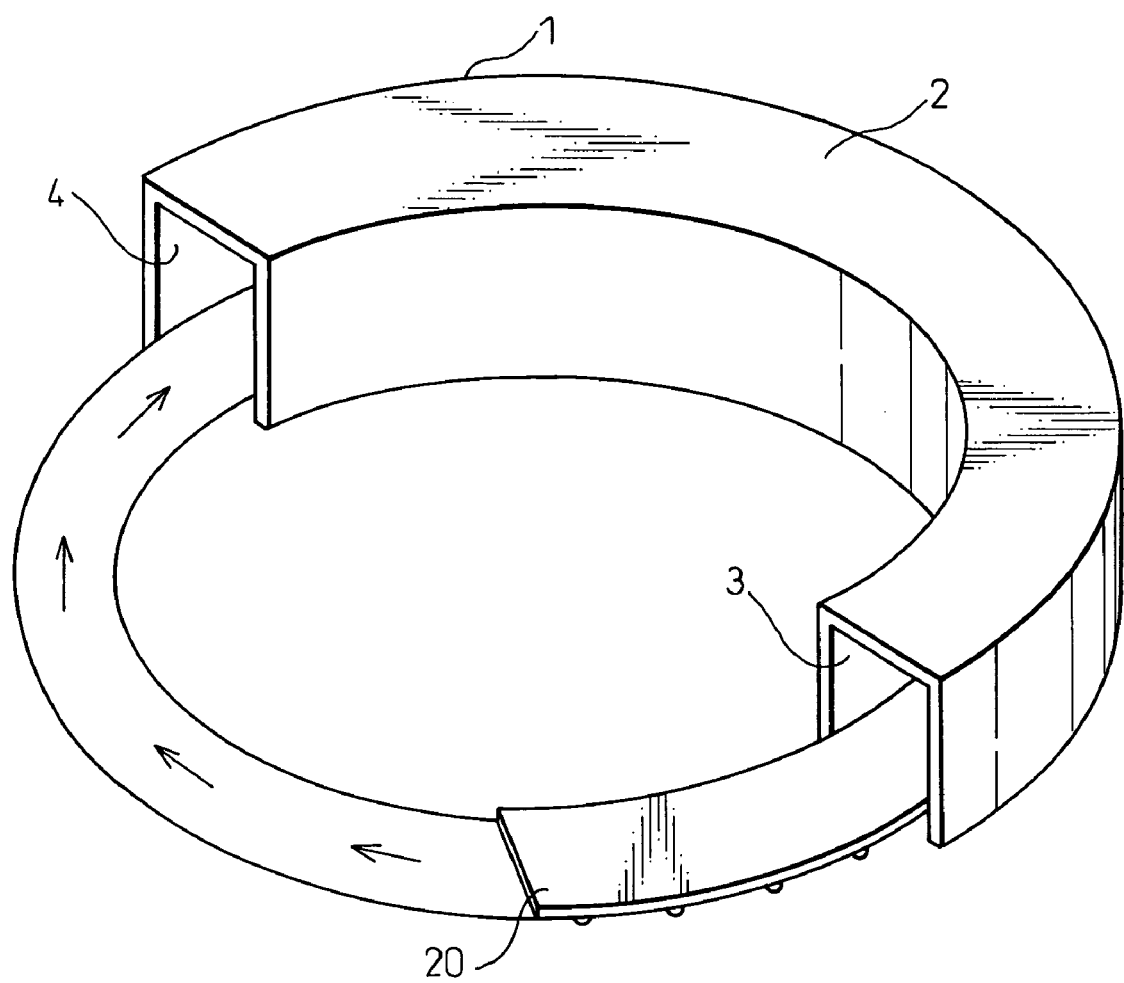
FIG. 1 is a cross-sectional view explaining the outline of a rotary furnace hearth.

Below, the present invention will be explained with reference to FIG. 3 to FIG. 6.

In the rotary furnace hearth 1 according to the present invention, the side blocks 9 and 10 built at the inner circumference end and outer circumference end of the hearth refractory bed 7 are made using refractories having a high compressive strength. Among the refractories 14, 15, etc. laid in two or more layers between the side blocks, at least the surface layer refractories 14 are made using refractories having a low compressive strength. By making such a hearth structure, the heat expansion force of the surface layer refractories 14 due to the high temperature atmosphere at the time of operation is absorbed by being blocked by the side blocks 9 and 10 having the high compressive strength and by compression of the surface layer refractories 14 themselves. Further, even when hearth material 16 or DRI drops into the joints of the surface layer refractories 14 and surface layer refractories 14, the surface layer refractories 14 having the low compressive strength are further compressed, so the side blocks 9 and 10 are not pushed out to the inner circumference side or outer circumference side. That is, by making this hearth structure, the contact between the side blocks 9 built at the inner circumference end of the hearth refractory bed 7 and the inner circumference side furnace side walls 3 and the contact between the side blocks 10 built at the outer circumference end of the hearth refractory bed 7 and the outer circumference side furnace side walls 4 can be reliably prevented.

In the hearth structure of a rotary furnace hearth 1 according to the present invention, the heat expansion force pressing the side blocks 9 and 10 and compressing the surface layer refractories 14 includes force conducted by the direct contact of the surface layer refractories 14 and also force conducted through the hearth material 16 or DRI dropped into the joints of the surface layer refractories 14 and surface layer refractories 14. For this reason, when the hearth material 16 or DRI dropped into the joints of the surface layer refractories 14 and surface layer refractories 14 is broken by the surrounding pressure, the fine powder produced by the breakage penetrates into the air holes of the surface layer refractories 14 and grows into a dense structure, raises the compressive strength of the surface layer refractories 14, and ends up causing them to lose their effect. Therefore, the compressive strength of the surface layer refractories 14 has to be lower than the compressive strength of the hearth material 16 and DRI so as not to break the hearth material 16 and DRI. The compressive strength of the hearth material 16 and DRI used in the rotary furnace hearth becomes 5 to 8 MPa at 800 to 1500° C. Therefore, the compressive strength of the surface layer refractories 14 must be 5 MPa or less at 800 to 1500° C. Further, to prevent breakage by the powder or pellet hearth material 16 laid on the top surface 16, the compressive strength of the surface layer refractories 14 must be made 0.1 MPa or more at 800 to 1500° C. As general examples of refractories having this property, there are the heat insulating bricks etc. used for heating furnaces etc. A1 to A7, B1 to B7, C1 to C3, etc. described in JIS R 2611-1992 may be mentioned. Note that the heat insulating bricks etc. used for this type of heating furnace fall in compressive strength along with a rise in temperature.

The lower layer refractories 15 laid at the bottom surface of the surface layer refractories 14 are not particularly limited. It is possible to use refractories with a low compressive strength in the same way as the surface layer refractories 14 or to use standard type refractories with a high compressive strength to obtain sufficient joints in the structure.

Further, for the hearth material 16 laid on the top surface of the surface layer refractories 14, dolomite, magnesium oxide, etc. is used, but it is preferable to use refractories containing magnesium oxide having the effect of being neutralized when the raw material 19 melts away.

When the compressive strength of the side blocks 9 and 10 is lower than the hearth material 16 or DRI, in the interaction with the contacting hearth material 16 and DRI, parts of the side blocks 9 and 10 may crack and the side blocks may break starting from there. Therefore, for preventing damage from the hearth materials 16 and DRI, the compressive strength of the side blocks 9 and 10 has to be higher than the compressive strength of the hearth materials 16 and DRI. On the other hand, having more than the necessary strength is uneconomical. Therefore, the compressive strength of the side blocks is suitably 8 to 130 MPa at 800 to 1500° C. As a general example of the refractories having such a property, there are the alumina-containing irregularly shaped refractories used for the high temperature parts of heating furnaces. Ones of class 4 or higher described in JIS R 2541-1976 may be mentioned.

Figure 4:
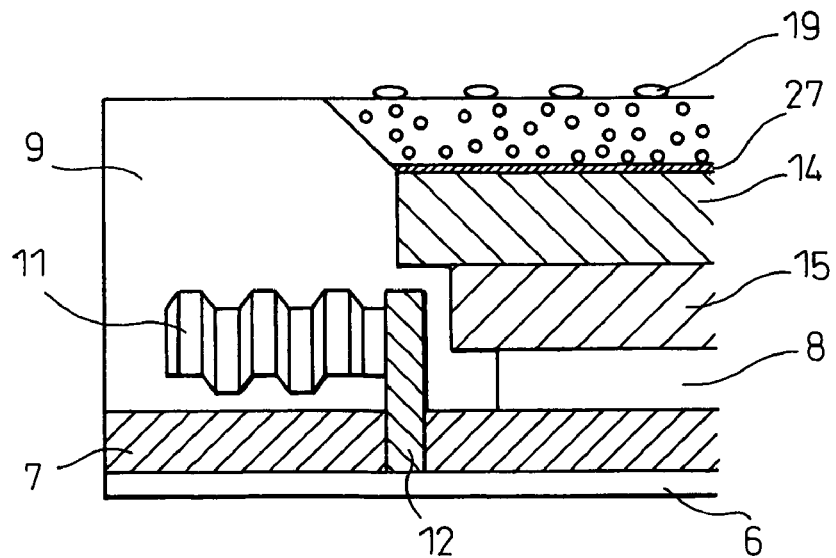
FIG. 4 is a cross-sectional view showing a method of fastening side blocks of a rotary furnace hearth according to the present invention.

Furthermore, as shown in FIG. 4, by strongly supporting the side blocks at the hearth refractory bed 7 using anchor bricks 11 or other fasteners, the heat expansion absorption function of the refractories can be improved more. That is, as explained above, the side blocks 9 and 10 are made using refractories having a compressive strength of 8 to 130 MPa at 800 to 1500° C. and the side blocks are strongly fastened to the hearth refractory bed 7 by the anchor bricks 11 and other fasteners, so the surface layer refractories 14 laid between the side blocks are constrained by the side blocks 9 and 10 having the high compressive strength. Even if trying to expand under heat, the surface layer refractories 14 having the low compressive strength themselves are compressed, so the side blocks at the two sides are not pushed apart and contact between the side blocks and furnace chamber 2 is not invited. Note that FIG. 4 is a cross-sectional view showing the method of fastening the side blocks 9. Anchor brick support hardware 12 is provided standing up at the iron plate 6, and this anchor brick support hardware 12 supports the anchor bricks 11 in this structure.

Figure 5:
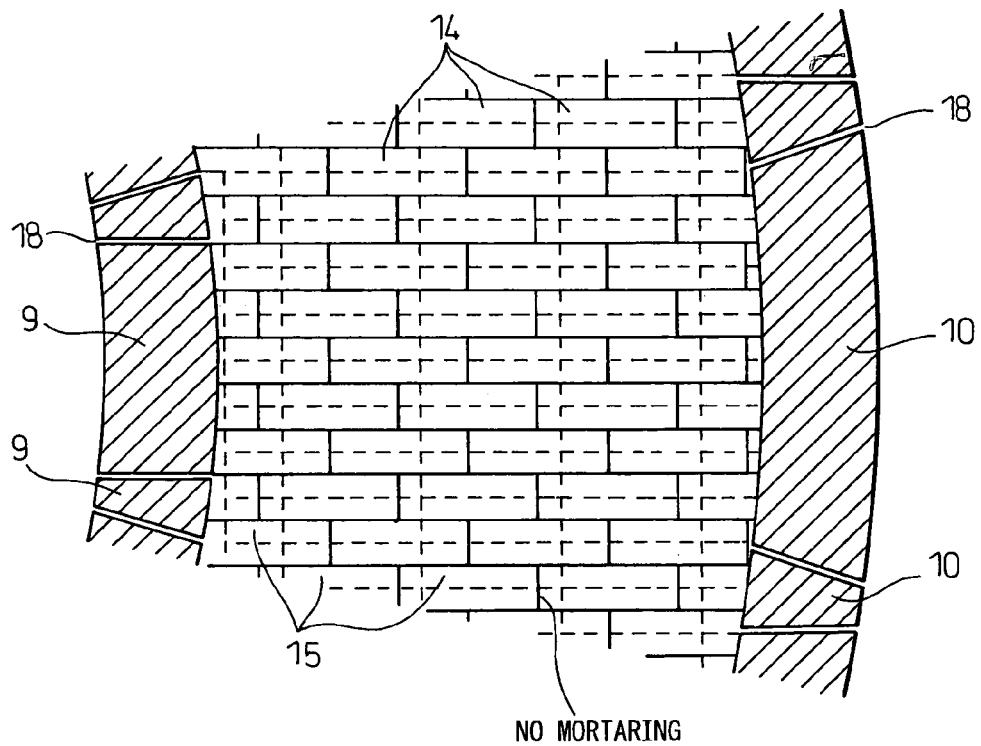
FIG. 5 is a schematic view showing an example of a method of laying refractories of a rotary furnace hearth according to the present invention.
Figure 6:
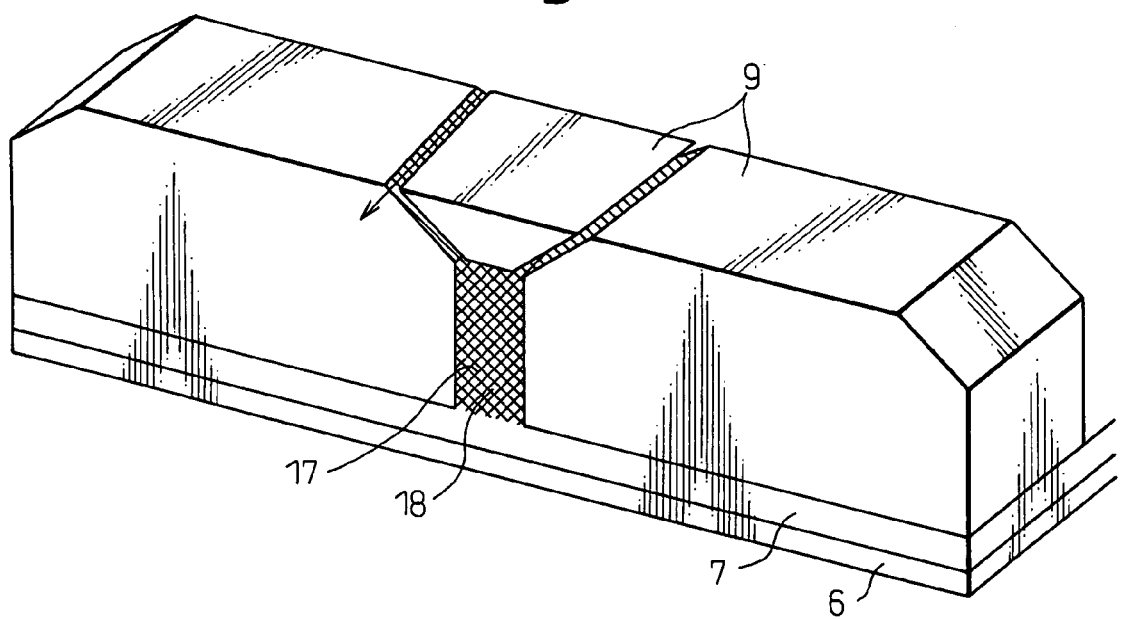
FIG. 6 is a schematic view showing an example of a method of building side blocks of a rotary furnace hearth according to the present invention.

The side blocks 9 and 10 built at the inner circumference end and outer circumference end of the hearth refractory bed 7 are preferably built while providing a plurality of clearances 18 in the circumferential direction as shown in FIGS. 5 and 6. This is so as to absorb the expansion when the side blocks themselves are exposed to a high temperature and thereby eliminate interference between the side blocks and prevent deformation or breakage of the strongly fastened hearth refractory bed 7. Further, at the top surfaces of the clearances 18, cover bricks 25 are provided for covering the clearances. Furthermore, the clearances 18 are preferably filled with ceramic fiber blankets 27 or other fillers 17. Due to this, it is possible to prevent the raw materials 19 and hearth materials 16 from entering the clearances 18 provided in the circumferential direction. Even if the hearth material or raw material enters the clearances 18, as shown in FIG. 6, it will be crushed and powderized by the side blocks and pushed outside of the side blocks from the clearances 18 formed in the side surfaces of the side blocks, so the clearances between the side blocks will be maintained.

FIG. 5 is a schematic view showing an example of the method of laying refractories of the rotary furnace hearth 1 according to the present invention. The broken lines show the lower layer refractories 15, while the solid lines show the surface layer refractories 14 laid at the top surface. As shown in FIG. 5, when laying the surface layer refractories 14 and lower layer refractories 15, it is preferable to lay them so that the joints in the surface layer refractories 14 and the joints in the lower layer refractories 15 are not connected. Further, while not shown, the same is true for the case of further laying refractories at the bottom surface of the lower layer refractories 15. It is preferable to lay them so that the joints in the lower layer refractories 15 and the joints of the refractories laid at the bottom surface are not connected in the vertical direction. By laying the refractories in this way, the joints of the refractories laid at least at the topmost layer will not reach the lower layer refractories 15 or hearth refractory bed 7 and therefore the heat expansion absorption function of the refractories can be maintained more.

That is, as explained above, in the hearth structure of a rotary furnace hearth 1 according to the present invention, the side blocks 9 and 10 are made using refractories having a high compressive strength, while the surface layer refractories 14 laid between the side blocks are made using refractories having a compressive strength lower than the hearth material 16 and DRI. Due to this, even if hearth materials 16 etc. drops into the joints between the surface layer refractories 14 and surface layer refractories 14, the surface layer refractories 14 themselves will further be compressed and thereby absorb the heat expansion. Even if long term operation results in hearth materials 16 etc. dropping into the joints of the surface layer refractories 14 and surface layer refractories 14, the joints of the upper and lower refractories are not connected in the vertical direction, so the dropped materials will not drop into the joints between the further lower layers of refractories and refractories and the heat expansion absorption function can be reliably secured.

Figure 3:
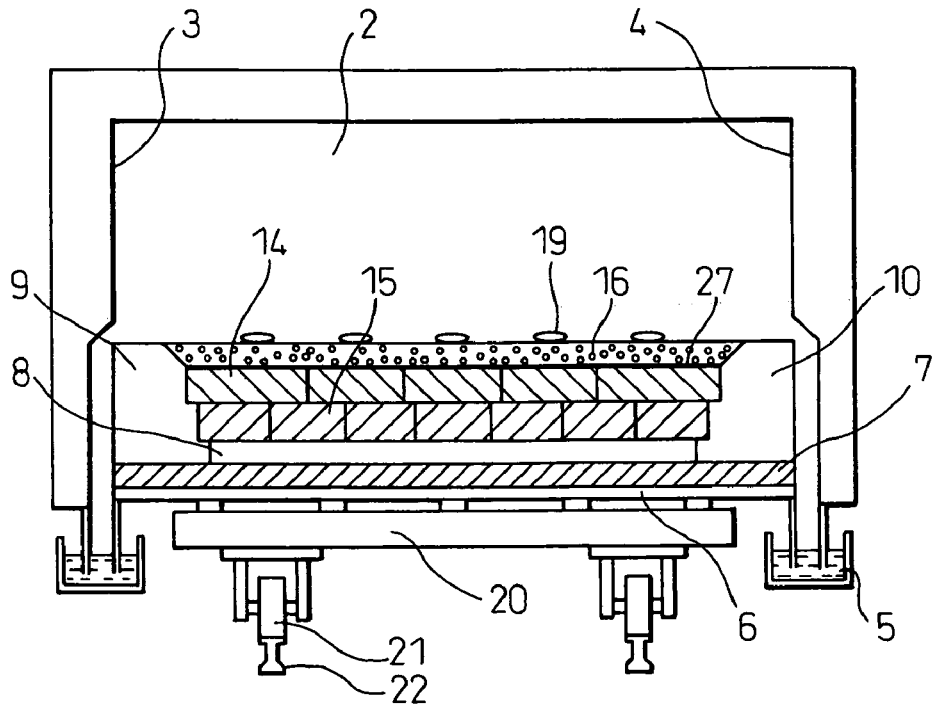
FIG. 3 is a cross-sectional view showing a hearth refractory structure of a rotary furnace hearth according to the present invention.

Furthermore, as shown in FIGS. 3 and 4, even if making the horizontal cross-sectional shapes of the side blocks upwardly tapering stepped shapes, the heat expansion absorption function of the refractories can be improved more. By making them upwardly tapering stepped shapes, it becomes possible to give vertical offset between the surface layer refractories 14 laid between the side blocks 9 and 10 and the lower refractories 15, so laying the refractories so that the joints of the surface layer refractories 14 and joints of the lower layer refractories 15 are not connected in the vertical direction becomes easy. Due to this, even if the hearth material 16 etc. drop into the joints of the surface layer refractories 14 at the surface layer refractories 14, the dropped material will not drop to the joints of the further lower layers of refractories and refractories, so the heat expansion absorption function can be reliably secured. Further, this effect is particularly exhibited when the hearth material 16 etc. drop between the side blocks and surface layer refractories 14. That is, the horizontal cross-sectional shapes of the side blocks are upwardly tapering stepped shapes, so even if the hearth material 16 etc. drop between the side blocks and the surface layer refractories 14, the dropped material will be stopped between the side blocks and surface layer refractories 14 and not drop any further, so the heat expansion absorption function can be reliably secured.

EMBODIMENTS

Next, an example of installation of a hearth structure of a rotary furnace hearth of an embodiment of the present invention will be explained. The conditions of this embodiment are conditions employed for demonstrating the workability and remarkable effects of the present invention. The present invention is not limited to these conditions.

First, in the rotary furnace hearth 1 according to the present invention, as shown in FIG. 1 and FIG. 4, an iron plate 6 is placed on the carriage 20. In the present embodiment, the carriage 20 and iron plate 6 are coupled by not shown bolts and nuts. This structure absorbs the difference in heat expansion of the same.

Further, as shown in FIG. 4, the top surface of the iron plate 6 is provided with anchor brick support hardware 12 standing up. In the present embodiment, welding is used to fasten the iron plate 6 and anchor brick support hardware 12. Anchor bricks 11 are connected to the other ends of the anchor brick support hardware 12. Note that in the present embodiment, the anchor brick support hardware 12 is provided standing up in the circumferential direction of the iron plate 6 at a pitch of about 300 to 600 mm.

Next, on the top surface of the same iron plate 6, the insulating materials of heat insulating boards and heat insulating bricks were used to lay a hearth refractory bed 7, irregularly shaped refractories were used at the inner circumference end and outer circumference end of this hearth refractory bed 7 to build side blocks 9 and 10, and the side blocks 9 and 10 were fastened by the anchor bricks 11 to the hearth refractory bed 7. Note that in this embodiment, as the irregularly shaped refractories used for the side blocks, high alumina castable refractories having a compressive strength of 80 to 90 MPa at 800 to 1500° C., that is, KVR-14R made by Krosaki Harima, were used.

Between the side blocks 9 and 10, as shown in FIG. 3, refractories 8, lower layer refractories 15, and surface layer refractories 14 are laid in that order from the bottom. In this embodiment, refractories 8 comprised of heat insulating boards, lower layer refractories 15 comprised of the light weight refractory heat insulating bricks A5 made by Isolite Insulating Products (LBK-23), and surface layer refractories 14 comprised of the light weight refractory heat insulating bricks A6 having a compressive strength of 0.3 to 4 MPa at 800 to 1300° C. made by Isolite Insulating Products (LBK-26) were used.

Further, when laying the surface layer refractories 14 and the lower layer refractories 15, they are laid so that the joints of the surface layer refractories 14 and the joints of the lower layer refractories 15 are not to be connected in the vertical direction, so the joints of the surface layer refractories 14 will never reach the hearth refractory bed 7. Note that the joints of the surface layer refractories 14 and joints of the lower layer refractories were not provided with mortar. Finally, on the top surface of the surface layer refractories 14, a magnesium oxide material of a particle size of 3 to 5 mm is placed as a hearth material 16. This completes the installation of the hearth structure of a rotary furnace hearth.

After the DRI facility having the above hearth structure is fabricated and test run/dry run, actual operation is started, but in the DRI facility having a hearth structure according to the present invention, safe and smooth operation can be continuously secured without the problem of the prior art of contact between the hearth structure and the furnace side walls 3 and 4 caused by heat expansion of the refractories.

As explained above, the hearth structure of a rotary furnace hearth 1 according to the present invention absorbs heat expansion by provision of clearances between the built up refractories 13 and filling the clearances with various types of refractories or refractory materials like in the past and absorbs the heat expansion of the refractories by compression of the built up refractories themselves, that is, the side blocks 9 and 10 or refractories 14, 15, etc. built up on the top surface of the hearth refractory bed 7, so there is no loss of the heat expansion absorption function due to hearth material 16 or DRI dropping into the clearances provided for heat expansion absorption like in the past.

That is, a hearth structure of a rotary furnace hearth 1 according to the present invention enables the heat expansion absorption function essential for a hearth structure to be reliably secured, so it is possible to completely prevent contact between the hearth structure and furnace side walls caused due to heat expansion of the refractories and possible to realize safe and smooth operation.

This contributes to long term stable operation of the rotary furnace hearth 1 and in turn to the environmental recycling of iron-making waste becoming increasingly necessary from the viewpoint of environmental protection in recent years. Further, it enables the stable recovery of high added value direct reduced iron from dust, sludge, and other iron-making waste.

INDUSTRIAL APPLICABILITY

A hearth structure of a rotary furnace hearth according to the present invention is structured providing clearances between the built up refractories 13 and laying various types of refractories or refractory materials in the clearances like in the past so as to absorb heat expansion caused along with operation and using compression of the built up refractories themselves to absorb heat expansion, so can fundamentally solve the problem of the hearth material 16 laid on top of the refractories 13 or DRI dropping into the clearances and causing a loss of the heat expansion absorption function.

That is, according to the rotary furnace hearth 1 having a hearth structure according to the present invention, it is possible to reliably secure the heat expansion absorption function essential for the hearth structure, so it is possible to completely prevent contact between the hearth structure and furnace side walls caused by heat expansion of the refractories 13 and possible to realize safe and smooth operation.

This contributes to long term stable operation of the rotary furnace hearth and in turn to the environmental recycling of iron-making waste becoming increasingly necessary from the viewpoint of environmental protection in recent years. Further, it enables the stable recovery of high added value direct reduced iron from dust, sludge, and other iron-making waste, so has an extremely great environmental impact and environmental effects.

The invention claimed is:

1. A hearth structure of a rotary furnace hearth comprising:
   a hearth refractory bed of a rotary furnace hearth;
   side blocks built at an inner circumference end and outer circumference end of the hearth refractory bed;
   two or more layers of refractories disposed between the side blocks built at the inner circumference end and the outer circumference end of the hearth refractory bed and
   a powder or pellet hearth material disposed on a top surface of the layers of the refractories, wherein
   the refractories laid at a topmost layer directly contact each other and have a compressive strength of 0.1 to 5 MPa at 800 to 1500° C., and
   the side blocks, comprise refractories having a compressive strength of 8 to 130 MPa at 800 to 1500° C.

2. The hearth structure of a rotary furnace hearth as set forth in claim 1 wherein said side blocks are fastened to the hearth refractory bed with anchor bricks.

3. The hearth structure of a rotary furnace hearth as set forth in claim 1 wherein said side blocks are disposed so as to form a plurality of clearances between said side blocks in a circumferential direction.

4. The hearth structure of a rotary furnace hearth as set forth in claim 1, wherein said side blocks are disposed so as to form an upwardly tapering stepped shape in a horizontal cross-sectional shape.

5. The hearth structure of a rotary furnace hearth as set forth in claim 1, wherein the refractories at the topmost layer are disposed so that joint lines are created therebetween,
   the refractories at a lower layer are disposed so that joint lines are created therebetween, and
   the joint lines of the refractories at the topmost layer do not correspond with the joint lines of the lower layer refractories.

* * * * *